A. G. Day.
Cleaning Soft Rubber.
No. 756. Reissued Jul. 12, 1859.
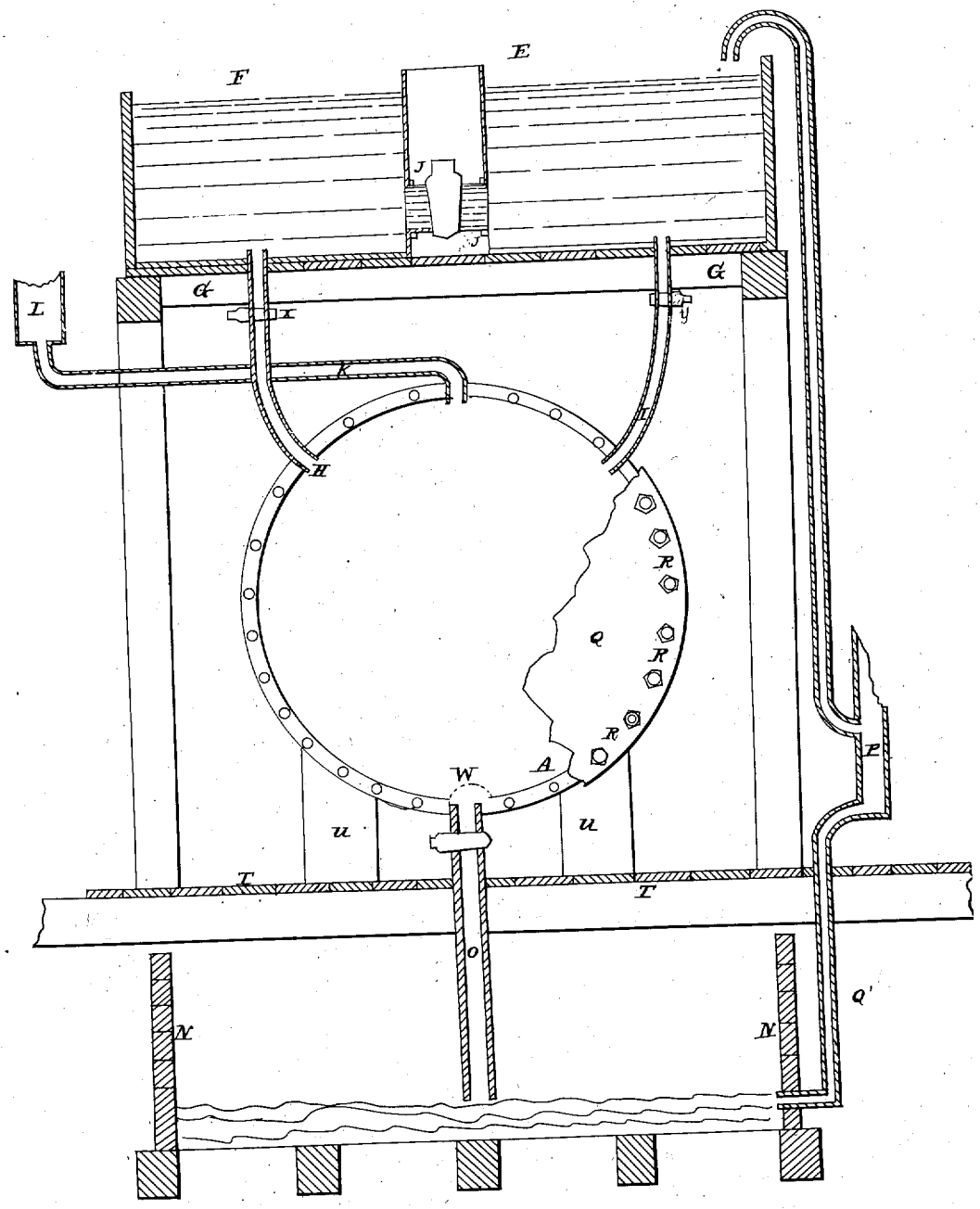

UNITED STATES PATENT OFFICE.

AUSTIN G. DAY, OF SEYMOUR, CONNECTICUT.

IMPROVEMENT IN CLEANSING CAOUTCHOUC.

Specification forming part of Letters Patent No. 15,067, dated June 10, 1856; Reissue No. 756, dated July 12, 1859.

*To all whom it may concern:*

Be it known that I, AUSTIN G. DAY, of the town of Seymour, county of New Haven, and State of Connecticut, have invented a new and improved method of cleaning caoutchouc and other crude vulcanizable gums, preparatory to manufacturing the same for the various purposes in the arts; and I hereby declare that the following is a full and exact description thereof, reference being had to the accompanying drawings and references thereof, which make part of this specification.

The invention consists in the use of the following successive operations: First, it takes the crude caoutchouc after it has been subjected to the tearing operation of toothed rollers—such as that described by the Sault patent—and subjects it to the action of caustic or carbonated alkaline or other equivalent solution, that the liquid may penetrate the pores of the caoutchouc and be instrumental in removing foreign matters therefrom, as set forth; second, the process thus stated is finished by removing the alkaline liquor by washing and then running the caoutchouc between toothed rollers.

All kinds of crude commercial caoutchouc contain more or less impurities, consisting of watery sap, sand, clay, bark, sticks, and other foreign bodies, varying from ten to fifty per cent. of the mass. I have ascertained that these impurities interfere with the success of the manufacture about in the proportion in which they are retained in the gum while it is being carried through the process of manufacture. They first interfere with the vulcanizing process by holding vapor for a long time, which finally escapes, leaving a blistered surface and porous structure, and thus cause varieties of damaged goods. The rubber known as "*Fine Pará*" contains the least impurities, (chiefly dried sap and bark,) and previous to my improvements was the only article used for the manufacture of fine goods. The East India rubber is a very complex product. It is the product of many species of trees and vines, having intermingled with it the usual impurities. The African, from the north and west coast of Africa, contains still greater impurities, and is often injured by contact with palm-oil during importation. The Mexican rubber and that from the west coast of South America are compact, hard, and black, and require the application of great mechanical power for their comminution.

All the crude gums in the market, except that first named, from the impurities they contain, are almost valueless for fine goods until subjected to a process of purification. The cleaning process has more than doubled the market value of inferior gums and made market for millions of pounds annually which could not have been sold at all without it. Having prepared the crude gum by passing it between toothed rollers arranged with the well-known slipping movement, loosening and partly removing the sand, bark, and clay, those foreign bodies which still adhere—as bark, sticks, &c.—are removed by water-soaking with alkaline or other equivalent solution, which will increase its specific gravity above that of water, and thus cause the impurities to sink to the bottom of the cistern of water in which the operation is performed; for while the bark, sticks, and gum float together on the water it is not easy to separate the impurities from the gum, as both float together; but by making the impurities heavier than the water the former two are easily separated, and are not liable to come in contact again, as the rubber floats and the impurities sink. To effect this result, after the gum has been comminuted, as indicated above, it is immersed in a solution of an alkaline or other equivalent liquid to render it water-soaked, and thus increase its specific gravity. It is then washed in water to separate the alkaline or equivalent liquid, again passed through between the toothed rollers for removing the remaining impurities so far as practicable by these means; but it was ascertained by inspection that there were yet in the gum cavities filled with dried sap which had not been reached by the process above described. I then caused the liquid used for saturating the impurities to be forced into the partially ruptured cavities by subjecting the material prepared as before described to a vacuum process in an iron cylinder, hereinafter to be described, in which, the air being exhausted, the liquor in which it is immersed, after restoring the pressure of the air, enters the cavities and acts upon the impurities, so that they may easily be removed by the subsequent part of the process.

In cleaning very hard and tough rubber—such as the Mexican—it is often found that the restored pressure of the air is not enough to force the liquor into the cavities partially ruptured to the desired extent. In such case additional pressure is applied, either by a column of liquid or by a force-pump, with a force of twenty to thirty-five pounds to the inch. The alkaline or equivalent liquor is allowed to remain in the iron vessel fifteen to sixty minutes, when it will be found that the liquid has sufficiently penetrated the pores of the gum to act upon its impurities, neutralizing vegetable acids, dissolving decayed matter, and water-soaking the bark, sticks, &c., so that water and the toothed rollers easily remove all the foreign matter left in the gum after the previous treatment. The alkaline liquor is used cold, and the strength may vary from 18° to 23° of Baumé. After the liquor from the iron cylinder is run off into suitable vessels the gum is transferred to a cistern of water and soaked and washed, by which more foreign matter separates and sinks to the bottom. The gum is again transferred to the toothed rollers, (arranged now with different speed from that used in the first use of these rollers by a change in the gear,) and the same is run into suitable sheets for drying and seasoning.

The value of thorough cleaning is not yet fully appreciated by the manufacturers. Vulcanizing is a delicate chemical process, depending for its success on the previous preparation of the materials which are to be decomposed and made to enter into new relations. The caoutchouc is a complicated hydrocarbon, of eight equivalents of carbon and seven of hydrogen, according to Tayen, which, in the presence of sulphur and in a close chamber with a temperature of 300° or thereabout of Fahrenheit's thermometer, gives off in large quantities sulphureted hydrogen and bisulphuret of carbon, and leaving a triple compound of carbon, hydrogen, and sulphur, varying in character according to the heat to which it has been exposed and the time elapsed during the exposure. The character of the process implies the necessity of purifying the materials before it be commenced, and the numerous failures in vulcanizing by manufacturers who have heretofore paid no attention to prepare the gum go to show that the preparation is of vital importance.

As before stated, for breaking down the crude caoutchouc I have adopted the breaking-rollers invented by Thomas Sault. I also use the same rollers as geared for sheeting purposes, and these I refer to when I speak of toothed rollers with a slipping movement used in my cleaning process.

The exhausting apparatus: This apparatus consists of a horizontal iron cylinder, arranged with an iron tank above it and another of equal capacity beneath it.

In the accompanying drawing, A represents the cylinder, made of boiler-iron, and of suitable size to contain the quantity of rubber or other gum to be worked at a single operation, and of such strength as to bear with safety the pressure to which it is to be subjected when exhausted by means of the pump. The cylinder is supported in the horizontal position on the floor T, from which it is raised about one foot by means of the locks U. A drain-pipe, *o*, having a strainer at W, leads through the floor T to the vat or cistern N. Above the cylinder, and supported upon the platform G, are two cisterns, E and F, connected with each other by the horizontal pipe J. From these cisterns the pipes H and I lead to cylinder A. An air-pump at L, of suitable size, is connected with the top of the cylinder A by means of pipe K. In the vat or cistern N, beneath the floor, as already shown, there is a pump, P, for which the supply-pipe Q′ furnishes the means of discharging the alkaline liquor from N to F and E. In the vat or cistern N is put the alkaline liquor, which consists of caustic or carbonated potash or soda or other equivalent liquid or solution, in which the sticks and bark soon are water-soaked, and become heavier than their bulk of water, so that in the washing operation these foreign bodies sink to the bottom and are easily separated from the gum. The liquor is then pumped up into vats F and E, first closing stop-cocks X and Y. The crude gum is now placed in the cylinder A in suitable quantities for convenient working. Thus a cylinder seven feet long by forty-two inches diameter, internal measurement, will work from one thousand two hundred pounds to one thousand five hundred pounds at a charge. The movable head Q of the cylinder is put in its place, and secured by means of the keys and joint-bolts R. The air-pump at L is then put in operation, and a vacuum produced in the cylinder, by means of which the alkaline liquid finds a ready access into the pores and interstices of the rubber, and is thus brought fully in contact with the bark and sticks and other foreign bodies contained therein, charging them with the liquid, and thus rendering them heavier than their own bulk of water, when the stop-cocks X and Y are opened and the liquor from F and E descends through pipes H and I into cylinder A till it is filled; but in order more completely to fill the gum with the alkali, a forcing-pump (not shown in the drawing) is attached to the cylinder A, by means of which additional liquor is forced into the cylinder until the internal pressure is increased to somewhat more than two atmospheres. I allow the liquid to remain on the caoutchouc until the woody and porous substances are fully impregnated. Experience has taught me that fifteen to twenty minutes is the best time to keep the liquor in contact with the rubber. As soon as this end is attained, pipe *o* is opened and the liquor descends into cistern N, while the gum is removed to the sheeting-rollers, (toothed rollers,) abundantly supplied with water, by which it is converted into sheets, ready for the drying-room. These rollers are prepared with a slipping movement, and so geared as to put the rubber into sheets of a kind of corrugated surface favorable to drying and seasoning.

Having now fully described the nature of the invention and the manner of conducting the process of cleaning caoutchouc and other vulcanizable gums and removing from them all foreign matters, and shown how it may be carried out in practice, what I claim as my invention, and desire to secure by Letters Patent in the present application, is—

The use of alkali, or its equivalent, for separating bark, sticks, and other foreign bodies from crude caoutchouc and other vulcanizable gums to prepare them for manufacturing.

AUSTIN G. DAY.

Witnesses:

SAML. L. BRINSEN,
THOMAS SAULT.